3,243,403
CURE COMPOSITIONS FOR POLYSULFIDE
POLYMERIC MATERIALS
Albert Franklin Vondy, Bordentown, and William E.
Leuchten, Hamilton Square, N.J., assignors to Thiokol
Chemical Corporation, Bristol, Pa.
No Drawing. Filed Feb. 27, 1961, Ser. No. 91,655
7 Claims. (Cl. 260—37)

This invention relates to the manufacture of rubber-like polysulfide polymers and more particularly to a method of curing polysulfide polymers to produce a white or pastel colored elastomeric product as well as to the product thus produced.

Polysulfide rubbers have long been known and methods of making them are disclosed in, for example, U.S. Patents 1,890,191; 2,206,641; 2,206,642; 2,206,643; 2,216,044; 2,221,650; 2,235,621; 2,255,228; 2,278,127 and 2,278,128. In general such synthetic rubbers are prepared by reacting polyfunctional organic compounds with alkali metal or alkaline earth metal sulfide solutions to produce high molecular weight polymers having the recurring unit (RSS), wherein R is usually a divalent organic radical that may vary widely in its specific structure as disclosed in the patents referred to above, and SS represents a disulfide linkage through which the organic radicals are interconnected. In order to improve the properties of the polymers it is customary to use a mixture of difunctional and trifunctional organic compounds wherein the trifunctional compound is present in a relatively small amount to produce a slightly cross-linked structure.

Although the organic radicals represented by the symbol R above may vary considerably in their specific structure, the commercially important polymers are usually made from certain aliphatic halides, e.g., alkylene chlorides such as ethylene dichloride and its homologues or oxygen-containing aliphatic dichlorides such as bis-beta-chloroethyl ether and bis-beta-chloroethyl formal. Thus most of the commercial polymers are primarily composed of relatively short chain divalent alkylene and/or oxahydrocarbon radicals interconnected by disulfide groups.

The present invention is particularly concerned with liquid polysulfide polymers which can be obtained from the high molecular weight polymers referred to above by a splitting process described in U.S. Patent 2,466,963. As disclosed in the latter patent, the high molecular weight polymers can be split to form polythiopolymercaptan polymers having molecular weights of the order of 500 to 25,000 and which are viscous liquids having viscosities within the range 300 to 100,000 centipoises. Such liquid polymers can be cured by any of various curing agents as disclosed in Patent 2,466,963 to form solid elastomers having excellent resistance to acids, alkalis, petroleum hydrocarbons and atmospheric oxidation. Such liquid polymers have been extensively used in the production of rubbery coatings on a variety of surfaces and have been found especially useful in providing rubbery films having good adhesion to metal surfaces. Thus the cured compositions have been used as sealants for sealing panes of glass to metal window frames and as lining materials for integral fuel tanks of aircraft.

While a very wide variety of such liquid polymers can be prepared as indicated by the disclosures of the patents referred to above, the polymers that are presently of commercial importance fall within a somewhat more limited group. The commercially important liquid polymers are particularly described in articles by Fettes and Jorczak published in "Industrial and Engineering Chemistry," vol. 42, page 2217 (1950) and vol. 43, page 324 (1951). As pointed out in these published articles, most of the commercially available liquid polymers are prepared from bis-beta-chloroethyl formal and are essentially composed of recurring $(S.CH_2.CH_2.O.CH_2.O.CH_2CH_2.S)$ groups and have free mercapto terminals through which they may be cured to form a solid elastomer. In the manufacture of these commercial polymers a small percentage of trichloropropane is commonly mixed with the bis-beta-chloroethyl formal to provide a cross-linking as described above.

Liquid polymers of the type described above when mixed with any of various curing agents such as for example, lead peroxide, can be applied to a metal surface and cured at room temperature or at an elevated temperature to form a strongly adherent, rubber-like coating on the metal.

In curing liquid polymers of the foregoing type, the polymers are mixed with a suitable curing agent such as for example, lead peroxide or one of the other curing agents mentioned in Patent 2,466,963. Additional ingredients such as cure-retarding agents, cure-accelerating agents, pigments, fillers and the like may or may not be incorporated in the cured composition, depending upon the application for which the material is to be used. By suitable choice of curing agents and modifying agents room temperature cures can be achieved with most of these liquid polymers. More often elevated temperatures up to say 300° F. are employed to reduce the overall curing time.

As conducive to a clearer understanding of the present invention, it may be pointed out that curing of the polymers occurs in three fairly well defined stages. In the first stage, the viscosity of the composition increases until it is no longer pourable. The time required to achieve a non-pourable consistency is known as "pot life" or "working life" and represents the period during which the cured composition can be readily molded to a desired configuration. In the second stage of the cure the material passes from a thick, unpourable sticky substance to a tack-free but still plastic state. The time interval for this second transformation is known as the "set time." In the third stage the material changes from a plastic kneadable consistency to an elastomeric state. The time required for this third stage transition will be referred to herein as the "cure time," and the total time interval which the material requires to pass through all three stages will be referred to as "total cure time."

The controllability of the cure rate at each of the several stages of the cure determines a considerable extent the nature of the applications for which a particular formulation can be used. As indicated above, with a given combination of liquid polymer and curing agent, the curing rate can be modified to some extent by the addition of certain modifying agents. For example, it is known that the "pot life" of the cured composition can be retarded by the addition of mildly acid components, and stearic acid is commonly added for this purpose. It is further known that cure rate can be accelerated by addition of alkaline modifiers to the cure composition. More generally the previously proposed curing agents for the polysulfide polymers are characterized by the fact that the cure rate is decelerated at a pH below 7 and accelerated at a pH above 7.

While this characteristic is helpful in many applications, there are certain applications for which it is not desirable. For example, if a conventional formulation is used to coat steel or concrete surfaces that have been acid-washed, residual acid present on the coated surface produces a retarding effect that is undesired. More particularly, the outer portion of the applied layer cures to the desired elastomeric form, whereas the portion of the applied layer immediately adjacent the acidic surface fails to cure, and hence an acceptably adherent coating cannot be attained. For such cures, an acid-accelerated curing composition is desirable, but no such composition has heretofore existed.

For certain of the coating applications of the polysulfide polymers in order to secure adequate adhesion to the surface to be coated, it is necessary either to use a primer coat or else to incorporate certain phenolic additives in the polymer composition. The use of a "built-in" adhesion promoter is preferable since it simplifies application of the coating composition. It is also desirable that the composition cure to a white or light-colored elastomer and various curing formulations capable of giving such a light-colored cured product have previously been proposed. However, the previously proposed "white cures" have involved the use of curing formulations that are incompatible with the phenolic adhesive adhesion promoters. Hence a need exists for a curing formulation for the polysulfide polymers which is both compatible with the known phenolic adhesion promoters and will cure to a light-colored elastomer.

It is accordingly an object of the present invention to provide a method of curing polysulfide polymers which is characterized by the fact that the cure is accelerated in the presence of acid. It is another object of the invention to provide a method of curing polysulfide polymers which involves the use of a formulation that is both compatible with phenolic adhesion-promoting agents and capable of curing to a light-colored elastomer. It is still another object of the invention to provide a light-colored elastomeric polysulfide coating that is strongly adherent to substrate surfaces. Other objects of the present invention will be in part obvious and in part pointed out hereafter.

The objects of the invention are achieved in general by using dibutyl tin oxide as a curing agent for a liquid polysulfide polymer of the type described above. It has been found that when dibutyl tin oxide is used as a curing agent compositions are obtained wherein the cure rate is accelerated under acid conditions and retarded under alkaline conditions, in contrast to previous cure formulations wherein the cure rate is retarded under acid conditions and accelerated under alkaline conditions. Also when dibutyl tin oxide is used as a curing agent, the usual phenolic additive adhesion-promoters can be incorporaetd in the formulation to yield a composition which not only cures to a light-colored elastomer but also gives good adhesion to substrate surfaces without the use of a preliminary primer coat.

In general the quantity of curing agent used and the curing conditions are the same as those used in the prior art cures. The quantity of dibutyl tin oxide employed can be varied over a relatively wide range, e.g., 5 to 200 parts per 100 parts of liquid polymer depending upon the cure rate desired. For some applications wherein a relatively long "pot life" is desired, a relatively small amount of the curing agent is used. On the other hand, in such applications as, for example, the making of dental molds, a rapid cure is desirable and quite large quantities of curing agent may be employed as indicated in the specific examples given below. Cures can be effected either at room temperature or at an elevated temperature up to say 300°–350° F. In addition to the polysulfide polymer and dibutyl tin oxide, the formulation to be cured may contain a phenolic adhesion promoter, e.g., from 3 to 10 parts of a phenolic resin per 100 parts of liquid polymer, as well as fillers and/or pigments up to about 200 parts per 100 parts of liquid polymer. Also solvents and plasticizers may be incorporated in the formulation.

In order to point out more fully the nature of the present invention, the following specific examples are given of illustrative formulations incorporating dibutyl tin oxide as a curing agent. The physical properties of the cured compositions are also indicated.

EXAMPLE I

The polysulfide polymer used in this example was a liquid polythiopolymercaptan polymer having a molecular weight of about 4,000 and about 2% cross-linking. It may be prepared in the manner described in the introductory portion of the present specification and is sold under the commercial designation LP–2. 100 parts of this liquid polymer were mixed with 25 parts of white powdered dibutyl tin oxide (Thermolite–15 manufactured by Metal and Thermit Corporation). This mixture was placed in a 70° C. oven for two hours and produced a white cured elastomer of a tough, resilient and flexible nature.

EXAMPLE II

The polysulfide polymer used in this example was similar to that used in Example I except that it had only about 0.5% of cross-linking. It is a commercially available polymer sold under the trade designation LP–32. Five formulations containing this polymer were prepared having the compositions indicated in Table 1 below. In each case 100 parts by weight of the liquid polymer were mixed with 50 parts by weight of pigment and different amounts of dibutyl tin oxide as indicated in the table. The filler was a titanium oxide powder having a particle size of 0.1 to 0.3 micron sold under the trade name Titanox AMO. The dibutyl tin oxide was used in the form of a paste composed of 2 parts by weight of dibutyl tin oxide and 1 part by weight of dibutyl phthalate.

The five formulations were cured at a temperature of 75° F.±2° and a relative humidity of 50%. The working life, set time and cure time of each sample was determined and the hardness of each cured sample was measured with a Shore Durometer using the "A" scale. The results are summarized in Table 1 wherein all quantities are given in parts by weight. The working life, set time and cure time are expressed in hours.

Table 1

| Component of Formulation | 1 | 2 | 3 | 4 | 5 |
| --- | --- | --- | --- | --- | --- |
| LP–32 liquid polymer | 100 | 100 | 100 | 100 | 100 |
| Titanox AMO | 50 | 50 | 50 | 50 | 50 |
| Dibutyl Tin Oxide paste | 7.5 | 11.25 | 15 | 22.5 | 30 |
| Amount of Dibutyl Tin Oxide in paste | 5 | 7.5 | 10 | 15 | 20 |
| Properties: | | | | | |
| Working Life | 1 | 0.83 | 0.42 | 0.5 | 0.5 |
| Tack-free set time | 6 | 2.5 | 2 | 1 | 0.75 |
| Cure Time | 16 | 6 | 4.5 | 3 | 3 |
| Shore "A" Hardness, after 24 hours | 8 | 20 | 35 | 35 | 35 |

The data of the foregoing table show the manner in which variations in the amount of dibutyl tin oxide produced changes in the working life, set time and cure time of the different formulations. It may be noted that by those skilled in this art, a Shore "A" hardness of 20 is considered a soft cure and a hardness of 35 is considered a reasonably firm cure.

The foregoing compositions were further tested to determine physical properties thereof after ageing. More particularly the compositions were pressed out into sheets at 287° F., and separate samples thereof were aged for seven days at room temperature, 158° F. and 212° F. Dumbbell shaped specimens of the aged materials were prepared and tested for tensile strength, elongation and Shore "A" hardness. The results of these tests are given in Table 2 below.

Table 2

| Properties | 1 | 2 | 3 | 4 | 5 |
|---|---|---|---|---|---|
| Aged at 75° F.: | | | | | |
| Tensile Strength in p.s.i. | 40 | 110 | 200 | 280 | 320 |
| Percent elongation | 1,000 | 450 | 400 | 600 | 650 |
| Shore "A" Hardness | 15 | 25 | 35 | 35 | 40 |
| Aged at 158° F.: | | | | | |
| Tensile Strength, p.s.i. | Soft | 220 | 270 | 285 | 360 |
| Percent elongation | | 400 | 380 | 450 | 580 |
| Shore "A" Hardness | | 27 | 35 | 40 | 60 |
| Aged at 212° F.: | | | | | |
| Tensile Strength, p.s.i. | 180 | 300 | 335 | 360 | 450 |
| Percent elongation | 300 | 280 | 250 | 300 | 300 |
| Shore "A" Hardness | 35 | 35 | 40 | 45 | 50 |

The foregoing data show that the cured elastomers exhibited excellent heat ageing characteristics.

EXAMPLE III

Formulations of liquid polythiopolymercaptan polymers incorporating dibutyl tin oxide as a curing agent are useful in the coating of surfaces to provide elastomeric protective films. The coatings may be applied in the usual manner by spraying, brushing or dipping techniques. As indicated in the introductory portion of the specification, dibutyl tin oxide as a curing agent makes possible formulations which both give a "white" cure and are compatible with phenolic resin adhesion-improving agents.

The present example illustrates formulations of this type. The phenolic additive incorporated in the formulations of this example was a phenolic resin identified by the trade name Durez 10694. The formulations given in Table 3 below also include the solvents methyl ethyl ketone and toluene to give the spray compositions the desired fluidity and varying amounts of stearic acid to illustrate the manner in which the cure rates are accelerated under acid conditions in the present formulations. In Table 3 cure times are given in minutes.

Table 3

| Components of Formula | 1 | 2 | 3 |
|---|---|---|---|
| LP-32 | 100 | 100 | 100 |
| Titanox AMO | 50 | 50 | 50 |
| Durez 10694 | 5 | 5 | 5 |
| Stearic acid | 0.5 | 1.0 | 1.5 |
| MEK | 30 | 30 | 30 |
| Toluene | 30 | 30 | 30 |
| Dibutyl Tin Oxide | 10 | 10 | 10 |
| Dibutyl Phthalate | 5 | 5 | 5 |
| Properties: | | | |
| Working life | 15 | 10 | 8 |
| Tack-free set time | 29 | 20 | 18 |
| Cure time | 145 | 125 | 115 |

The data of Table 3 clearly bring out the fact that as the amount of stearic acid is increased the working life, tack-free set time and cure time of the mixtures all decrease. They demonstrate the accelerating effect of a low pH material on the cure rates of formulations employing dibutyl tin oxide.

EXAMPLE IV

This example, like Example III, illustrates a formulation suitable for spray applications. In the formulations of this example the stearic acid of Example III is replaced by an alkaline material, namely, a precipitated calcium carbonate having a pH of about 9.0 and identified by the trade name Mutifex MM. Also a quantity of sulfur is included in these formulations to improve the cold flow properties of the cured material. The compositions and properties of these formulations are summarized in Table 4 below.

Table 4

| Components of Formula | 1 | 2 | 3 | 4 |
|---|---|---|---|---|
| LP-32 | 100 | 100 | 100 | 100 |
| Titanox AMO | 10 | 10 | 10 | 10 |
| Mutifex MM | 20 | 25 | 30 | 30 |
| Durez 10694 | 5 | 5 | 5 | |
| Sulfur | 0.15 | 0.15 | 0.15 | 0.15 |
| MEK | 30 | 30 | 30 | 28 |
| Toluene | 30 | 30 | 30 | 52 |
| Dibutyl Tin Oxide | 10 | 10 | 10 | 8 |
| Dibutyl Phthalate | 5 | 5 | 7.5 | 8 |
| Properties: | | | | |
| Working Life in minutes | 36 | 42 | 45 | 22 |
| Set Time in minutes | 127 | 127 | 135 | 44 |
| Cure Time in hours | 16 | 16 | 16 | 16 |
| Spray properties | Good | Good | Fair | Fair |

The longer working life of the formulations of Table 4 make them more suitable for spray applications than those of Table 3. The data of Table 4 brings out the fact that longer cure times are obtained in formulations of this type in the presence of alkaline materials.

EXAMPLE V

The data of this example illustrate the good adhesive properties that can be obtained with products prepared from formulations employing dibutyl tin oxide as a curing agent. Data are given in this example for four formulations having the compositions and cure rates indicated in Table 5 below.

Table 5

| Components of Formula | 1 | 2 | 3 | 4 |
|---|---|---|---|---|
| LP-32 | 100 | 100 | 100 | 100 |
| Titanox AMO | 50 | 50 | 50 | 50 |
| Durez 10694 | 5 | 5 | 5 | 5 |
| Dibutyl Tin Oxide | 8 | 10 | 16 | 20 |
| Dibutyl Phthalate | 4 | 5 | 8 | 10 |
| Properties: | | | | |
| Working Life in minutes | 110 | 40 | 40 | 30 |
| Tack-free Set Time in hours | 8 | 3 | 1.5 | 0.75 |
| Cure Time in hours | 16 | 16 | 5 | 4 |
| Shore "A" Hardness | 13 | 20 | 35 | 35 |

To determine the effectiveness of these four formulations as adhesives, they were tested according to ASTM test method D903–49. In accordance with this test method the compositions were used to adhere pieces of cotton duck cloth to panels of several different substances, specifically aluminum, steel and glass. After curing, the number of pounds required to peel a 1" wide strip of the cotton duck cloth off of each panel was measured, and the type of failure was observed to determine whether cohesive failure or adhesive failure had occurred.

Tests were conducted both with and without water immersion of the samples. In one set of tests the samples were aged for seven days at 70° F. and a relative humidity of 50% and then tested without water immersion. In the second set of tests, the samples were aged for seven days as before, then placed in water at 70° F. for four days, removed from the water and peeled while still wet. The results of these tests are given in Table 6 wherein the values are the pounds required to peel a one-inch width of the duck cloth from the panel. The letters C and A after the values given in Table 6 indicate respectively cohesive failure and adhesive failure.

Table 6

| Sample No | 1 | 2 | 3 | 4 |
|---|---|---|---|---|
| Before Water Immersion: | | | | |
| Aluminum | 15C | 15C | 14C | 11C |
| Steel | 19C | 17C | 17C | 15C |
| Glass | 16C | 15C | 14C | 10A |
| After Water Immersion: | | | | |
| Aluminum | 14C | 12C | 11A | 10C |
| Steel | 15C | 14C | 13C | 13C |
| Glass | 0 | 0 | 0 | 0 |

EXAMPLE VI

This example illustrates formulations suitable for use in preparing dental impressions, wherein a "white cure" and exceptionally high cure rates are desirable. The compositions and properties of six formulations of this type are given in Table 7 below. Formulations 1 and 2 of Table 7 contain a calcium carbonate pigment which is essentially ground oyster shells and is sold under the trade name "Laminar." Formulations 3 and 4 contain a wet ground calcium carbonate pigment sold under the trade name "Camel Wite." Both of these calcium carbonates have a pH of approximately 8.5. Formulations 5 and 6 of Table 7 contain a titanium dioxide pigment having a pH of about 7. The polysulfide polymer used in these formulations is the same as that of Example I.

Table 7

| Components of Formula | 1 | 2 | 3 | 4 | 5 | 6 |
|---|---|---|---|---|---|---|
| LP-2 | 100 | 100 | 100 | 100 | 100 | 100 |
| Laminar | 10 | 20 | | | | |
| Camel Wite | | | 10 | 20 | | |
| Titanox AMO | | | | | 10 | 20 |
| Dibutyl Tin Oxide | 140 | 140 | 140 | 140 | 140 | 140 |
| Dibutyl Phthalate | 70 | 70 | 70 | 70 | 70 | 70 |
| Properties: | | | | | | |
| Working Life in minutes | 2 | 3 | 2 | 3 | 3 | 3 |
| Set Time in minutes | 3 | 4 | 3 | 4 | 4 | 4 |
| Tack-free Time in minutes | 4 | 6 | 5 | 6 | 5 | 5 |
| Cure Time in minutes | 5 | 8 | 7 | 8 | 6 | 6 |

For dental impressions it is desirable that formulations cure over a period of the order of five to ten minutes, and the data of Table 7 show that the present formulations cure in periods of this general magnitude. The white pigments used produce pleasant appearing white formulations which cure to resilient compounds having a hardness as measured by the Shore "A" durometer of approximately 30.

It is of course to be understood that the foregoing examples are illustrative only and that numerous changes can be made in the ingredients, proportions and conditions specifically set forth therein without departing from the spirit of the invention as defined in the appended claims.

We claim:

1. The method of curing a polysulfide polymer which comprises mixing a liquid polythiopolymercaptan polymer having a molecular weight of 500 to 25,000 with a sufficient amount of dibutyl tin oxide to cure said polymer and causing said curing agent to cure said liquid polymer to a solid elastomer.

2. The method of curing a polysulfide polymer which comprises mixing a liquid polythiopolymercaptan polymer essentially composed of aliphatic oxahydrocarbon radicals interconnected by polysulfide groups and having a molecular weight of 500 to 25,000 with a sufficient amount of dibutyl tin oxide to cure said polymer and causing said curing agent to cure said liquid polymer to a solid elastomer.

3. In a method of curing a polysulfide polymer of the type wherein a liquid polythiopolymercaptan having a molecular weight of 500 to 25,000 is mixed with a sufficient amount of a curing agent to cure said polythiopolymercaptan and the resulting mixture is cured to form a solid elastomer, the improvement which comprises using dibutyl tin oxide as said curing agent.

4. The method of curing a polysulfide polymer which comprises mixing 100 parts by weight of liquid polythiopolymercaptan polymer having a molecular weight of 500 to 25,000 with from 5 to 200 parts dibutyl tin oxide and up to 200 parts of white pigment and causing the resulting mixture to cure to form a light colored elastomer.

5. A method according to claim 4 and wherein from three to ten parts of phenolic resin is incorporated in the mixture to improve its adhesion to substrate surfaces.

6. A cured elastomer produced by the process of claim 1.

7. A cured elastomer produced by the process of claim 4.

References Cited by the Examiner

UNITED STATES PATENTS

| | | | |
|---|---|---|---|
| 2,832,753 | 4/1958 | Weinberg | 260—45.75 |
| 2,940,958 | 6/1960 | Smith | 260—79 |
| 2,940,959 | 6/1960 | Rosenthal | 260—79 |

FOREIGN PATENTS 788,653   1/1958   Great Britain.

OTHER REFERENCES

Gobel: 53 C.A. 10826(a) 1959.

Hirschland et al.: Metal-Organic Compounds, "Organotin Compounds," published by ACS, 1959, (pages 207 and 210 relied upon).

LEON J. BERCOVITZ, *Primary Examiner.*

HAROLD N. BURSTEIN, DONALD E. CZAJA, JOHN C. MARTIN, PAUL HENDRICKSON,
*Assistant Examiners.*